3,156,698
2-[α-(ORTHO SUBSTITUTED BENZIMIDOYL) BENZYL] PYRIDINE COMPOUNDS

Horace A. De Wald and Roger D. Westland, Ann Arbor, Mich., assignors to Parke, Davis & Company, Detroit, Mich., a corporation of Michigan
No Drawing. Filed Mar. 11, 1963, Ser. No. 264,075
7 Claims. (Cl. 260—296)

The present invention relates to imine compounds. More particularly, it relates to 2-[α(ortho substituted benzimidoyl)benzyl]pyridine compounds which can be represented in free base form by the formula

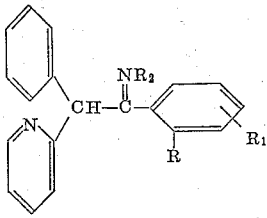

and to methods for their production; where R represents lower alkyl, lower alkoxy, lower alkylthio, phenyl, trifluoromethyl, or halogen; $R_1$ represents hydrogen, lower alkyl, lower alkoxy, or halogen; R and $R_1$ at position 3 also being combinable as the —CH=CH—CH=CH— radical so that the entire group

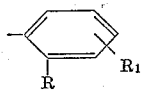

represents 1-naphthyl; and $R_2$ represents hydrogen or methyl. In the compounds of the invention, the preferred lower alkyl groups are those containing not more than 3 carbon atoms, and the preferred halogen is chlorine.

Although in the foregoing general formula the compounds of the invention are represented as having an imine structure, this is only one of the equivalent tautomeric forms in which these compounds can exist. The facile interconversion between the imine form and other tautomeric forms is illustrated by the following equation.

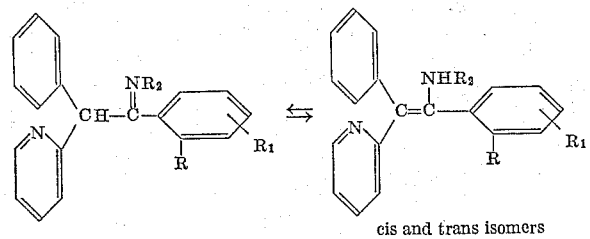

cis and trans isomers

In any particular compound of the invention, one of the indicated tautomeric forms, that is the imine, the cis enamine or the trans enamine, may be favored by such factors as acidic or basic conditions or solvent. For reasons of convenience, the compounds of the invention are consistently formulated and named as having the imine structure but because of the equilibrium state which can exist among the tautomeric forms, it will be appreciated that the imine structure includes the tautomers as well.

In accordance with the invention, compounds of the formula

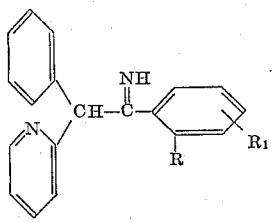

are produced by reacting a benzonitrile compound of the formula

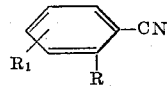

with a reactive metal derivative of 2-benzylpyridine under anhydrous conditions, followed by hydrolysis of the resulting reaction product; where R and $R_1$ are as defined before. Some examples of suitable reactive metal derivatives of 2-benzylpyridine are the lithium, sodium, potassium, calcium, and magnesium halide derivatives. The preferred reactive metal derivatives are the alkali metal derivatives which can be prepared by reacting 2-benzylpyridine with such reagents as phenyllithium, butyllithium, lithium piperidide, sodium diisopropylamide, or potassium diisopropylamide. Of the preferred alkali metal derivatives, the lithium derivative is the most suitable. The first phase of the process is carried out by reacting the benzonitrile compound with a reactive metal derivative, preferably an alkali metal derivative, of 2-benzylpyridine in a non-hydroxylic solvent. The benzonitrile compound and the reactive metal derivative of 2-benzylpyridine are normally employed in approximately equimolar quantities although if desired an excess of either can be used. Some examples of suitable non-hydroxylic solvents are ethers, ether-hydrocarbon mixtures, tetrahydrofuran, diethylene glycol dimethyl ether and liquid ammonia. If desired, the reactive metal derivative of 2-benzylpyridine can be formed directly in the reaction mixture and used without isolation. The reaction of the benzonitrile compound with the reactive metal derivative of 2-benzylpyridine proceeds at a satisfactory rate at room temperature or below although a temperature within the range of about −35° C. to 100° C. or the reflux temperature of the solvent can be used. Preferably the reaction is carried out at reflux in a low boiling ether or ether-hydrocarbon mixture at about 35–50° C. Depending upon the temperature, the time required for substantial completion of the reaction varies between about 30 minutes and 24 hours. In the preferred temperature range, the reaction between the benzonitrile compound and the reactive metal derivative of 2-benzylpyridine is usually substantially complete within three hours. The desired product is then obtained following hydrolysis of the reaction mixture with water or other aqueous medium. To prevent further hydrolysis of the imine group to a ketone group, prolonged contact with a strongly acidic or strongly basic hydrolysis medium is avoided.

Also in accordance with the invention, compounds of the formula

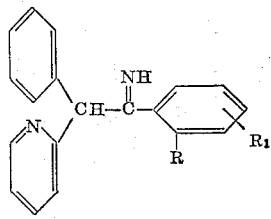

are produced by reducing compounds of the formula

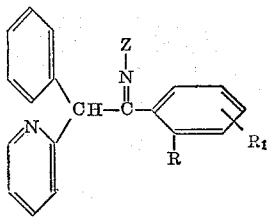

where Z is a hydroxyl, amino or lower alkylamino group and R and $R_1$ are as defined before. The preferred method of reduction is catalytic hydrogenation with a Raney nickel catalyst. Other catalysts such as Raney cobalt can be used. Noble metal catalysts are avoided because they cause side reactions. The temperature and pressure employed depend on whether an oxime or a hydrazone is being used as starting material. In the hydrogenation of an oxime with Raney nickel catalyst, it is preferred to used hydrogen at a pressure of 1000–2000 pounds per square inch and a temperature of 50–100° C. In the hydrogenation of a hydrazone, elevated pressures are not necessary and the reduction can be carried out with Raney nickel at 50–100° C. Some examples of suitable solvents are lower alkanols, dioxane, tetrahydrofuran, and dimethylformamide. Depending on such factors as catalyst activity, the hydrogenation is carried out for about three hours or until the calculated amount of hydrogen has been absorbed.

The oximes and hydrazones employed as starting materials can be prepared by reacting the corresponding ketone with hydroxylamine, hydrazine or a lower alkylhydrazine. The corresponding ketones required for reaction with hydroxylamine, hydrazine or a lower alkylhydrazine can be obtained by the reaction of the lithium derivative of 2-benzylpyridine with a compound of the formula

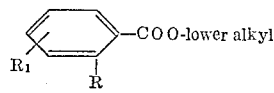

in a non-hydroxylic solvent, followed by hydrolysis of the resulting reaction mixture; where R and $R_1$ are as defined before.

Further in accordance with the invention, compounds of the formula

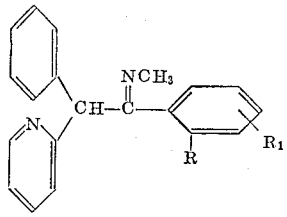

are produced by reacting a compound of the formula

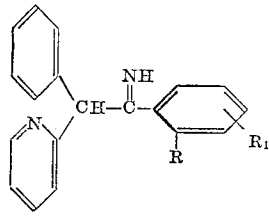

or a reactive metal derivation thereof with a methylating agent; where R and $R^1$ are as defined before. Some examples of suitable methylating agents are esters of methanol such as methyl halides and dimethyl sulfate. Other methylating agents such as trimethyloxonium fluoroborate can also be used. In the case where the starting material to be methylated is a reactive metal derivative of the imine, it is preferably the lithium derivative which can be formed in situ or added to the reaction mixture as such. The imine or its reactive metal derivative and the methylating agent are normally used in approximately equimolar amount, although an excess of the methylating agent can also be employed. Some examples of suitable solvents for the reaction are dimethylformamide, methylene dichloride, tetrahydrofuran and ether. The reaction can be carried out over a wide range of temperatures, typically from about 0–100° C. With dimethyl sulfate and trimethyloxonium fluoroborate, temperatures below room temperature are preferred whereas with methyl halides higher temperatures are preferred. Depending upon the specific methylating agent and reaction temperature, the methylation is substantially complete within from 30 minutes to 24 hours. In those cases where the free imine is used as a starting material, the reaction is preferably carried out in the presence of an added base. In those cases where the lithium derivative is employed as a starting material it can be produced by the reaction of the lithium derivative of 2-benzylpyridine with a substituted benzonitrile in a non-hydroxylic medium without hydrolysis of the reaction mixture, or it can be produced by the reaction of the free imine with a strong base such as lithium hydride, lithium hydroxide, or lithium methoxide. Other reactive metal derivatives of the imine can be prepared similarly by reaction with the corresponding sodium and potassium bases.

The compounds of the invention are preferably produced and used in the forms of their free bases. Alternatively by pH adjustment or by reaction of a free base with an acid, preferably under anhydrous conditions, the compounds of the invention can be produced and used in acid-addition salt form. The acid-addition salt forms are comparatively unstable because they tend to undergo hydrolysis or to revert to the free bases but in other respects they are equivalent to the free bases for the purposes of the invention.

The compounds of the invention have useful pharmacological and particularly hormonal properties. They are ovulation inhibitors and consequently are of value as anti-fertility agents. In addition, they are hypocholesteremic agents and cause a decrease in blood cholesterol. They are active upon oral administration but can also be given by the parenteral route if desired.

The invention is illustrated by the following examples.

*Example 1*

A solution of phenyllithium is prepared by adding a solution of 187 g. of bromobenzene in 500 ml. of anhydrous ether with vogorous stirring to 17 g. of lithium chips in 500 ml. of anhydrous ether. The mixture is maintained under reflux of regulating the rate of addition and is stirred for 30 minutes after the addition is complete. With continued stirring, a solution of 210 g. of 2-benzylpridine in 500 ml. of anhydrous ether is added to the solution of phenyllithium at such a rate that the ether is maintained at reflux. The reaction mixture which now contains the lithium derivative of 2-benzylpyridine is stirred for one more hour and then a solution of 117 g. of o-methylbenzonitrile in 200 ml. of anhydrous ether is added. The mixture is heated under reflux for 12 hours, chilled, and stirred with 300 ml. of saturated aqueous ammonium chloride solution, added slowly and in small portions. The ether layer is separated, dried over anhydrous magnesium sulfate, and concentrated to give an oily residue of 2-[α-(o-methylbenzimidoyl) benzyl]pyridine; B.P. 180–190° C. at 0.3 to 0.5 mm. For further purification, the compound can be crystallized from methanol; M.P. 76–80° C.

By the foregoing general procedure, using 12.5 g. of phenyllithium and 22 g. of 2-benzylpyridine, and with the substitution of 15.7 g. of o-ethylbenzonitrile for the o-methylbenzonitrile, the product obtained is 2-[α-(o-ethylbenzimidoyl)benzyl]pyridine; M.P. 98–100° C. after crystallization from methanol.

By the foregoing general procedure, using 12.5 g. of phenyllithium and 22 g. of 2-benzylpyridine, and with the substitution of 17.5 g. of o-isopropylbenzonitrile for the o-methylbenzonitrile, the product obtained is 2-[α-(o-isopropylbenzimidoyl)benzyl]pyridine; M.P. 109–112° C. following crystallization from methanol.

*Example 2*

23 g. of 2-benzylpyridine is added to a solution of phenyllithium (prepared from 2.1 g. of lithium and 23 g. of bromobenzene in 100 ml. of ether) and the mixture is heated under reflux for one-half hour. A solution of 16.5 g. of o-chlorobenzonitrile in 100 ml. of ether is added and the mixture is heated under reflux for three more hours, cooled, and stirred with 250 ml. of ice water. The ether solution is separated, dried, and evaporated under reduced pressure to give a residue of crude 2-[α-(o-chlororbenzimidoyl)benzyl]pyridine. For purification the product can be dissolved in ether, the solution chromatographed on alumina and the solid fractions recovered from the eluates; recrystallized from methanol, M.P. 86-88° C.

By the foregoing procedure, with the substitution of equivalent amounts of the designated benzonitriles for the o-chlorobenzonitrile, the following compounds are obtained.

From o-methoxybenzonitrile, 2 - [α-(o-methoxybenzimidoyl)benzyl]pyridine; M.P. 75-79° C.
From o-ethoxybenzonitrile, 2-[α-(o-ethoxybenzimidoyl)benzyl]pyridine; M.P. 103-107° C.
From o-methylthiobenzonitrile, 2-[α-(o-methylthiobenzimidoyl)benzyl]pyridine; M.P. 163-165° C.
From 2,4-dimethylbenzonitrile, 2-[α-(2,4-dimethylbenzimidoyl)benzyl]pyridine; M.P. 93–95° C.
From 2,5-dimethylbenzonitrile, 2-[α-(2,5-dimethylbenzimidoyl)benzyl]pyridine; M.P. 91–93° C.
From o - phenylbenzonitrile, 2-[α-(o-phenylbenzimidoyl)benzyl]pyridine; M.P. 119–123° C.
From 2,3-dichlorobenzonitrile, 2-[α-2,3-dichlorobenzimidoyl)benzyl]pyridine; M.P. 136–138° C.
From 2,4-dichlorobenzonitrile, 2-[α-(2, 4-dichlorobenzimidoyl)benzyl]pyridine; M.P. 114–117° C.
From 2 - methyl-3-chlorobenzonitrile, 2-[α-(2-methyl- 3 - chlorobenzimidoyl)benzyl]pyridine; M.P. 130–133° C.
From 2,6 - dimethoxybenzonitrile, 2-[α-(2,6-dimethoxybenzimidoyl)benzyl]pyridine; M.P. 183–184° C.
From 2-ethoxy-3-methoxybenzonitrile, 2-[α-(2-ethoxy-3-methoxybenzimidoyl)benzyl]pyridine; M.P. 122–123° C.
From o-trifluoromethylbenzonitrile, 2 - [α - (o - trifluoromethylbenzimidoyl) benzyl]pyridine; M.P. 91–93° C.

Example 3

A solution of 15.3 g. of diethylamine in 50 ml. of anhydrous ether is added to a solution of 49 g. of 23.7% n-butyllithium (in heptane) in 75 ml. of anhydrous ether. The mixutre is stirred for 30 minutes and then a solution of 31.8 g. of 2-benzylpyridine in 50 ml. of ether is added with external cooling to maintain the temperature at about 25° C. Thirty minutes later, 32.7 g. of o-bromobenzonitrile in 50 ml. of ether is added and the mixture is stirred for 2½ days and decomposed by stirring with saturated ammonium chloride solution. The ether layer is separated, dried, and evaporated to give a residue of 2-[α-(o - bromobenzimidoyl)benzyl]pyridine; M.P. 107–109° C. after crystallization from methanol.

Example 4

A solution of 23 g. of 2-benzylpyridine in 60 ml. of ether is added to a solution of phenyllithium (prepared from 2.1 g. of lithium and 23 g. of bromobenzene in 100 ml. of ether) and the mixture is heated under reflux for 50 minutes and then treated with a solution of 20 g. of 2,6-dichlorobenzonitrile in 100 ml. of tetrahydrofuran-ether. Heating under reflux is continued for five more hours and then 250 ml. of ice water is added and the ether phase is separated, washed with saturated sodium chloride solution, dried and evaporated under reduced pressure to give a residue of crude 2-[α-(2,6-dichlorobenzimidoyl)benzyl]pyridine. For purification it is dissolved in ether, the solution chromatographed over alumina, and the recovered product crystallized from methanol; M.P. 159-161° C.

Example 5

A solution of 83 g. of 2-benzylpyridine in 150 ml. of ether is added slowly to a solution of phenyllithium (prepared from 7.5 g. of lithium and 85 g. of bromobenzene in 500 ml. of ether) and the mixture is stirred for one hour after the addition is complete. A solution of 75 g. of 1-naphthonitrile in 200 ml. of ether is added and the mixture is heated under reflux for 12 hours, cooled and stirred with saturated ammonium chloride solution. The ether layer is separated, combined with an ether extract of the aqueous layer, washed with saturated sodium chloride solution, dried, and concentrated to give a residue of crude 2-[α-(1-naphthimidoyl) - benzyl]pyridine; M.P. 132–135° C. following crystallization from methanol-benzene.

Example 6

A mixture of 4.4 g. of α-phenyl-α-(2-pyridyl)-2,5-dimethylacetophenone oxime (geometric isomer of M.P. 156–159° C.) in 40 ml. of 10% ammonia in methanol containing 1 g. of Raney nickel catalyst is shaken in a hydrogen atmosphere at 1500 pounds per square inch pressure for three hours at 60–70° C. The solution is cooled, filtered, and evaporated under reduced pressure. The residue of 2-[α-(2,5-dimethylbenzimidoyl)benzyl]-pyridine is crystallized from methanol; M.P. 89–91° C.

The starting material is obtained as follows. A solution of 47 g. of 2-benzylpyridine in 100 ml. of anhydrous ether is added to a solution of phenyllithium (prepared from 4.2 g. of lithium and 47 g. of bromobenzene in 300 ml. of ether) and the mixture is stirred for one hour. The resulting solution containing the lithium derivative of 2-benzylpyridine is treated with 43.7 g. of methyl 2,5-dimethylbenzoate in 100 ml. of anhydrous ether and the mixture is heated under reflux for 12 hours, cooled, and stirred with saturated ammonium chloride solution. The ether phase is separated, washed, dried, and evaporated to give a residue of α-phenyl-α-(2-pyridyl)-2,5-dimethylacetophenone; M.P. 77–80° C. following crystallization from aqueous methanol. A solution of 7.5 g. of α-phenyl-α-(2-pyridyl)-2,5-dimethylacetophenone in 75 ml. of methanol is treated with 1.8 g. of hydroxylamine hydrochloride in 5 ml. of water and then with 3.5 g. of sodium acetate trihydrate in 5 ml. of water. The mixture is heated under reflux for 48 hours, concentrated to a small volume under reduced pressure, diluted with chloroform, washed with water and with saturated sodium chloride solution, dried and evaporated under reduced pressure. The residue of crude α-phenyl-α-(2-pyridyl)-2,5-dimethylacetophenone oxime is crystallized from ethyl acetate-petroleum ether; geometric isomers M.P. 156–159° C. and 137–140° C.

Example 7

A mixture of 2 g. of crude α-phenyl-α-(2-pyridyl)-2-methylacetophenone hydrazone and 2 g. of Raney nickel catalyst in 50 ml. of methanol containing 10 percent ammonia is heated and stirred under reflux in a reaction vessel flushed with hydrogen for four hours. The solution is cooled and filtered and the filtrate is evaporated under reduced pressure. The residue of 2-[α-(o-methylbenzimidoyl)-benzyl]pyridine is crystallized from methanol; M.P. 76–80° C.

The starting material is obtained as follows. A solution of 47 g. of 2-benzylpyridine in 100 ml. of anhydrous ether is added to a solution of phenyllithium (prepared from 4.2 g. of lithium and 47 g. of bromobenzene in 300 ml. of ether) and the mixture is stirred for one hour. The resulting solution containing the lithium derivative of 2-benzylpyridine is treated with 40 g. of methyl o-methylbenzoate in 100 ml. of anhydrous ether and the mixture is heated under reflux for 12 hours, cooled, and stirred with saturated ammonium chloride solution to react with lithium. The ether phase is separated, washed, dried, and evaporated to give a residue of α-phenyl-α-(2-pyridyl)-2-methylacetophenone; M.P. 145–149° C. following crystallization from methanol. A solution of 2.8 g. of α-phenyl-α-(2-pyridyl)-2-methylacetophenone in a minimum quantity of ethanol is treated with 2.5 ml. of anhydrous hydrazine followed by several drops of acetic acid. The mixture is heated under reflux for three hours, cooled and diluted with water. The insoluble α-phenyl-α-(2-pyridyl)-2-methylacetophenone hydrazone which separates is collected and is suitable for use without further purification.

By the foregoing general procedures, α-phenyl-α-(2-pyridyl)-2-methylacetophenone is converted by reaction with methylhydrazine to the methylhydrazone which upon reduction yields 2-[α-(o-methylbenzimidoyl)benzyl]pyridine; M.P. 76–80° C. after crystallization from methanol.

*Example 8*

A solution of 1.1 g. of picric acid in a small quantity of methanol is added to a solution of 1.4 g. of 2-[α-(o-methylbenzimidoyl)benzyl]pyridine in warm methanol. The insoluble 2-[α-(o-methylbenzimidoyl)benzyl]pyridine picrate which separates is collected and washed with ether; M.P. 197–199° C.

*Example 9*

A solution of phenyllithium is prepared from 2.1 g. of lithium and 23 g. of bromobenzene in 100 ml. of ether by adding the bromobenzene slowly and heating the mixture under reflux for 40 minutes. With stirring, 23 g. of 2-benzylpyridine in 50 ml. of ether is added and the mixture is heated under reflux for one hour. To this solution which now contains the lithium derivative of 2-benzylpyridine is added 14 g. of o-methylbenzonitrile and heating under reflux is continued for three more hours. The reaction mixture containing the lithium derivative of 2-[α-(o-methylbenzimidoyl)benzyl]pyridine is cooled in an ice bath and 15 g. of dimethyl sulfate is slowly added. Stirring is continued during this operation and for 30 minutes thereafter, following which 250 ml. of ice water is added. The ether layer is separated, washed with saturated sodium chloride solution, dried over magnesium sulfate, filtered and evaporated to give a residue of 2-[α-(N-methyl-o-methylbenzimidoyl)benzyl]pyridine; M.P. 106–108° C. following chromatography of a petroleum ether solution on alumina and crystallization from methanol.

By the foregoing procedure, with the substitution of 16.5 g. of o-chlorobenzonitrile for the o-methylbenzonitrile, the product obtained is 2-[α-(N-methyl-o-chlorobenzimidoyl)benzyl]pyridine; M.P. 111–113° C.

By the foregoing procedure, with the substitution of 15.7 g. of 2,5-dimethylbenzonitrile for the o-methylbenzonitrile, the product obtained is 2-[α-(N-methyl-2,5-dimethylbenzimidoyl)benzyl]pyridine; M.P. 108–110° C.

The foregoing compounds can also be prepared by the reaction of the imines with dimethyl sulfate in the presence of sodium hydroxide or potassium hydroxide.

We claim:
1. A compound of the formula

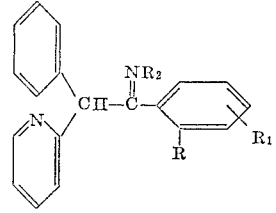

where R is a member of the class consisting of lower alkyl, lower alkoxy, lower alkylthio, phenyl, trifluoromethyl, and halogen; $R_1$ is a member of the class consisting of hydrogen, lower alkyl, lower alkoxy and halogen; in combination R and $R_1$ at position 3 are

—CH=CH—CH=CH— and $R_2$ is a member of the class consisting of hydrogen and methyl.

2. 2-[α-(o-lower alkylbenzimidoyl)benzyl]pyridine.
3. 2-[α-(o-methylbenzimidoyl)benzyl]pyridine.
4. 2-[α-(o-trifluoromethylbenzimidoyl)benzyl]-pyridine.
5. 2-[α-(o-halobenzimidoyl)benzyl]pyridine.
6. 2-[α-(2,3-dichlorobenzimidoyl)benzyl]pyridine.
7. 2-[α-(1-naphthimidoyl)benzyl]pyridine.

No references cited.